July 12, 1927.  
M. M. POMERANZ  
1,635,952

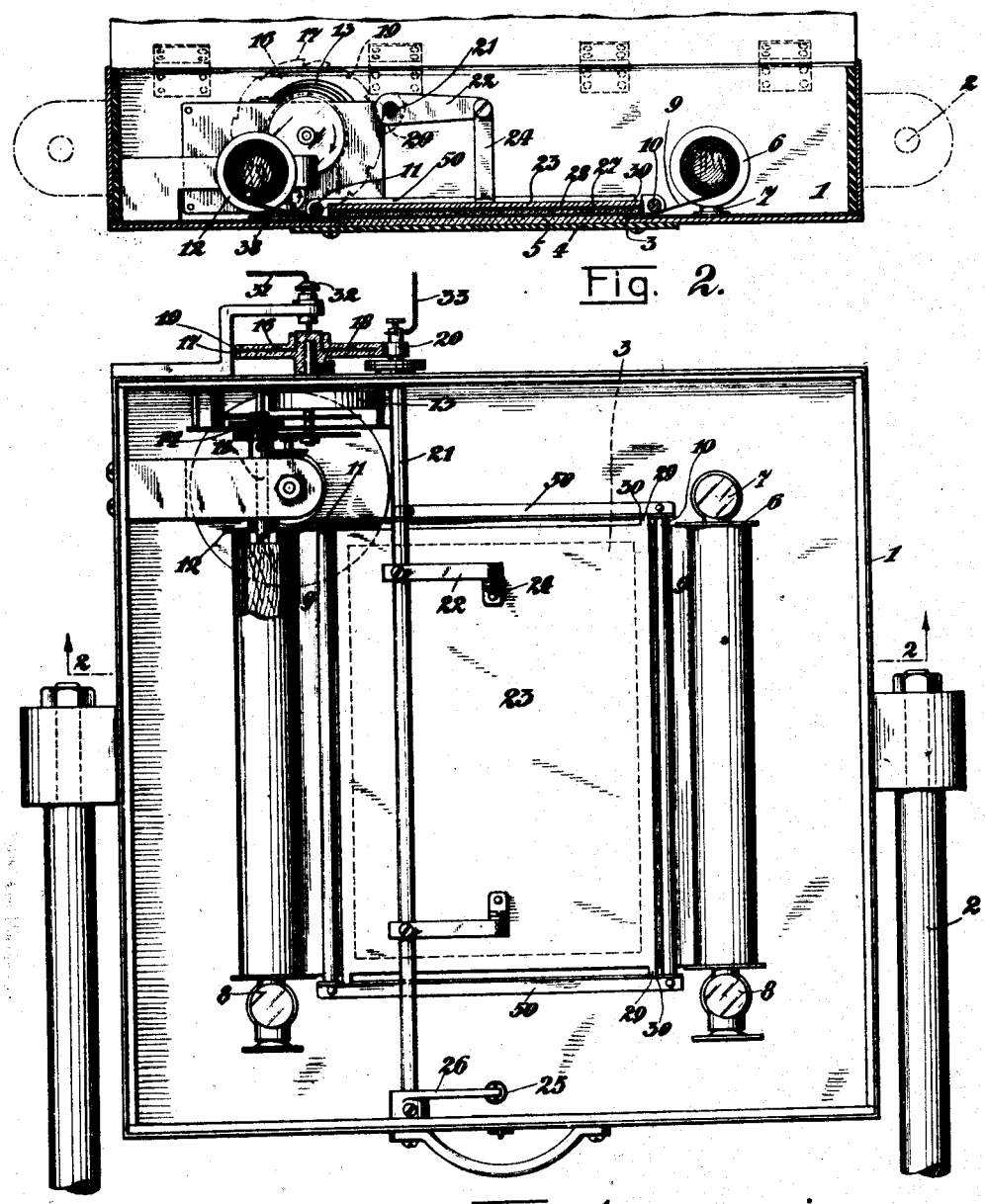

RÖNTGEN RAY PHOTOGRAPHIC MACHINE

Filed Nov. 25. 1925   2 Sheets-Sheet 2

INVENTOR  
MAURICE M. POMERANZ  
BY  
ATTORNEYS

Patented July 12, 1927.

1,635,952

UNITED STATES PATENT OFFICE.

MAURICE M. POMERANZ, OF NEW YORK, N. Y.

RÖNTGEN-RAY PHOTOGRAPHIC MACHINE.

Application filed November 25, 1925. Serial No. 71,388.

This invention has for its primary object the automatic intermittent exposure of a sensitized film to the action of Röntgen rays for taking a series of photographs of a moving human organ.

Another object of this invention is to intensify each photograph by providing an intensifying screen on each side of the film and a Röntgen ray reflecting plate to reflect back the rays after they have passed through the film.

Another object of this invention is automatically to number each exposed section of the film by exposing with each section one of a series of numbers, and so photographing on successive sections their corresponding numbers.

Another object is automatically to move the film the proper distance as the diameter of the take-up spool increases with the winding of the film thereon.

In order that the nature of my invention may be clearly understood, I shall first describe in detail the mode in which I at present prefer to carry the invention into practice, and then point out the various features of the invention in the claims.

Reference is to be had to the accompanying drawings forming part of this specification in which the same parts are designated by like characters in all the figures.

Figure 1 is a rear elevation of a machine embodying my invention with the casing cover removed.

Figure 2 is a sectional view thereof on the line 2—2, Figure 1.

Figure 3:
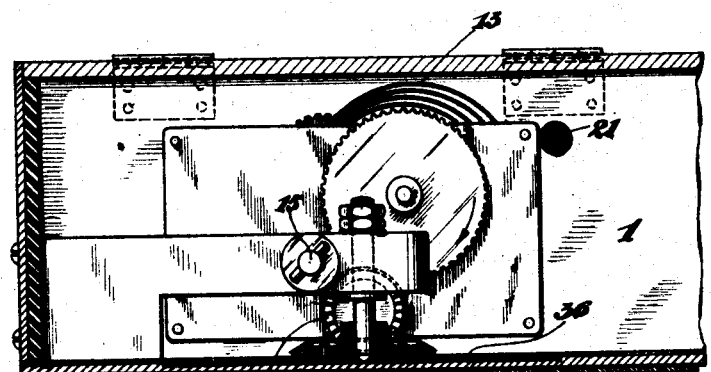
Figure 3 is a sectional view on the line 3—3, Fig. 4.
Figure 4:
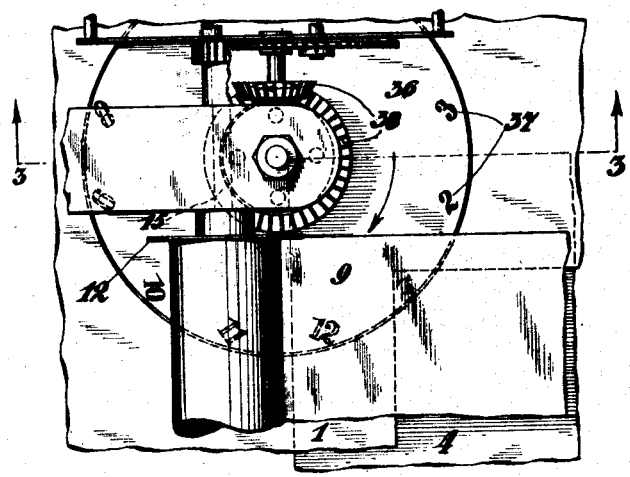
Figure 4 is an enlarged detail view of the transparent numbering carrier shown in Figure 1.

Reference character 1 represents the casing made of metal or any suitable material and supported by standards 2. Casing 1 is provided with an opening 3, and in this instance is lined with lead along the sides and front thereof to prevent the Röntgen rays from entering the casing anywhere except through opening 3. It is to be understood that the Röntgen tube is placed in front of the casing, or below the opening 3 as shown in Fig. 2, so that the object photographed is between the tube and the opening. 4 is a covering for the opening of any suitable material, for example Bakelite, which excludes ordinary light rays but transmits Röntgen rays. Secured in the opening 3 is an intensifying screen 5 for a purpose well-known in the art.

In the casing I provide a spool 6 removably supported in bearings 7 and 8, the latter of which may be spring-pressed for removing the spool. Spool 6 carries a supply of sensitized film 9 which in this instance, is led under idler 10 and over intensifying screen 5 as viewed in Figure 2, between lateral guides 50, then under idler 11 and around take-up spool 12, which is removably supported in a manner similar to supply spool 6.

Take-up spool 12, in this instance, is rotated by a spiral spring 13 through clockwork gears 14 and stub shaft 15 keyed to spool 12. To wind up spring 13, I prefer to use a multiple cam wheel 16 made of fibre or other suitable non-electric conducting material. It will thus be understood that the spiral spring 13 is wound up by the rotation, manual or otherwise, of the multiple cam wheel 16.

The cam wheel 16 is formed with a series of cam projections 17, which are steeply sloped on one side and gently sloped on the other side, and, in this instance, has imbedded in it an electrical conductor 18 with leads running to every cam recess 19 on the periphery of the wheel, thus providing electrical contacts in each recess. As a cam follower, I prefer to use a pawl 20 made of electric conducting material, which is carried on a rock shaft 21 journaled in the sides of casing 1, and provided intermediate its ends with arms 22. Rock shaft 21 is resiliently pulled toward the front of the casing by a spring 25 connected to the casing 1 and an arm 26 carried by the rock shaft.

Arms 22 are connected by means of links 24 to a presser plate 23 which is composed of any suitable Röntgen ray reflecting material. This presser plate has secured thereto an intensifying screen 27, a layer of felt or other resilient material 28 being interposed between the presser plate and the screen to enable the intensifying screen to make uniform yielding contact with the film. The presser plate is preferably formed with projections 29 which ride in slots 30 in the guides 50 and thus keep the plate parallel with the front of the casing.

The reason for using two intensifying screens is that it permits a much clearer and sharper photograph to be taken, since the Röntgen rays are intensified before they reach the film, by means of screen 5, pass through screen 27 and are reflected back by means of plate 23, and intensified again by means of intensifying screen 27. It will be seen that a Röntgen ray photograph taken by my method of reflecting back the rays after passing through the film and then intensifying the reflected rays will be much superior to the ordinary photograph taken with merely one intensifying screen.

When the cam wheel 16 is rotated to wind up the spring 13 and then released, the follower or pawl 20 will move along the periphery of the cam wheel and, as will be seen, the presser plate 23 and screen 27 secured thereto, will be lifted when the follower rides on a cam projection 17, and pulled back under the action of spring 25 when the follower rides in the cam recess 19.

When the follower rides in a recess 19 and the presser plate is pulled by spring 25 into contact with the film, the motion of the film is momentarily interrupted by reason of said contact. However, the spring 13 also is rotating take-up spool 12 simultaneous with the rotation of the multiple cam wheel. When the film is momentarily stationary, the spring 13 is acting to lift the plate 23 by the action of the steep side of the cam projection on the follower 20. The film on the take-up spool is momentarily tightened but no excessive tension is placed thereon as the presser plate is almost immediately removed from the film.

It will thus be seen that I have provided a means for automatically and intermittently moving the film, and for raising and releasing the presser plate automatically in harmony with the intermittent motion of the film, that is, the presser plate is automatically raised when the film is moving and lowered when the film is stationary.

To move the film the proper distance past the opening 3 as the diameter of the spool 12 increases with the winding of the film thereon, I prefer to grade the cam projection spacings on the cam wheel 16 to correspond with the increasing diameter of the take-up spool as the film is wound thereon.

Figure 5:
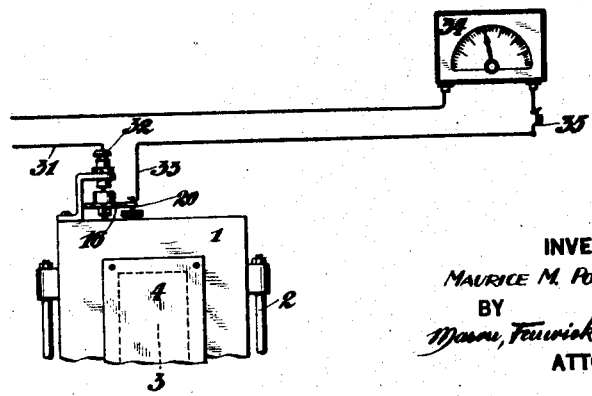
Figure 5 is a diagrammatic view showing the electric connections between the Röntgen tube and the film moving means.

As will be realized, it is necessary that the film be not exposed to the Röntgen rays while the film is in motion. To attain this result, I prefer automatically to open the Röntgen tube circuit when the film is moving, and close said circuit when the film is stationary. As shown in Figs. 1 and 5, the electric conductor 18 has connected thereto a lead 31 by means of a removable plug 32. Follower 20 also has connected therewith a lead 33, these leads being part of an electric circuit for the Röntgen tube (not shown). The Röntgen tube is connected across the open ends of the wires shown in Figure 5.

In the circuit, I prefer to interpose an ordinary timer 34 which automatically limits exactly the duration of each exposure. I also interpose a hand switch 35 in the circuit for opening and closing the tube circuit at will.

From the above, it will be understood that when the follower 20 rides into the recess 19 on the multiple cam wheel 16, it makes contact with a lead of the conductor 18 and so closes the circuit and energizes the Röntgen tube. As the film is momentarily stationary when the follower is in the recess, a photograph is taken, the exact length of time of exposure being determined by the timer 34. When the follower rides on the cam projection 17, the film is in motion because of the rotation of the spool 12 by spring 13, and, at the same time, the circuit is open as the follower is no longer in contact with a lead of the conductor 18.

As it is advantageous to successively number each exposed section of film, I employ a transparent carrier 36 having numbers 37 thereon which are opaque to Röntgen rays, and so placed that a number of the carrier is in position for exposure. In this instance, I use a disk for the carrier, and this disk is rotated in harmony with the film moving means by means of gear 38 attached to the clockwork 14. As the film is moved, a new number appears in the field of exposure and is photographed on the section of film.

It will thus be seen that I have provided a Röntgen ray photographic machine that automatically and intermittently moves the film into and out of position for exposure, closes the Röntgen tube circuit when the film is stationary and opens the circuit when the film is moving, numbers each successive section of exposed film with a new number, always moves the film a constant distance, and intensifies and makes much clearer than ordinarily is possible each photograph.

It is evident that many changes may be made in the specific construction and arrangement described without departing from the boundaries of my invention as defined by the following claims.

I claim as my invention:

1. In a Röntgen ray machine, the combination with a Röntgen tube and electric circuit therefor, film supply and take up spools for moving a film into and out of position for exposure, means for operating the film take-up spool, and means operated by the film moving means for intermittently arresting the motion of the film and its take up spool, of an electric switch operated in harmony with the film and take up spool for automatically closing the tube circuit when the motion of the film is interrupted and opening the circuit when said motion is resumed.

2. In a Röntgen ray machine, the combination with a Röntgen tube and electric circuit therefor, of means for moving a film into and out of position for exposure, means for intermittently arresting the motion of the film, including a multiple cam wheel operated by the film moving means, and a switch operated in harmony with the cam wheel for closing the tube circuit when the motion of the film is interrupted and opening the circuit when said motion is resumed.

3. The structure in claim 2 in which the switch comprises electric contacts corresponding to the projections on the cam wheel and a movable contact member included in the film arresting means.

4. In a Röntgen ray machine, the combination with a Röntgen tube and electric circuit therefor, means for moving a film into and out of position for exposure, and a spring-pressed plate for engaging and arresting the motion of the film, of means operated by the film moving means for intermittently operating the film arresting plate, and an electric switch operated in harmony with said film arresting plate for automatically closing the tube circuit when the motion of the film is interrupted and opening the circuit when said motion is resumed.

5. The structure in claim 4 where the plate operating means comprises a multiple cam wheel operated in harmony with the film moving means, a cam follower, a rock shaft carrying said follower, arms on said rock shaft, and links connecting said arms with said plate.

6. In a Röntgen ray machine, the combination with a Röntgen tube and electric circuit therefor, a casing provided with an opening, and means for moving a film in said casing past said opening, of an intensifying screen on each side of the film, and a reciprocating reflecting plate secured to the screen farthest from the Röntgen tube.

7. In a Röntgen ray machine, the combination with a Röntgen tube and electric circuit therefor, a casing provided with an opening, and means for moving a film in said casing past said opening, of an intensifying screen on each side of the film, a Röntgen ray reflecting plate secured to the screen farthest from the tube, and means for removing said plate and screen secured thereto from the film to permit the motion of the film, and restoring the plate and screen to contact with the film to arrest the motion of the film.

8. In a Röntgen ray machine, the combination with a Röntgen tube and electric circuit therefor, film supply and take-up spools for moving a film into and out of position for exposure, of means for intermittently arresting the motion of the film including a multiple cam wheel connected with the film moving means and having projections thereon which are graded in spacing to correspond with the increasing diameter of the take-up spool.

9. In a Röntgen ray machine, the combination with a Röntgen tube and electric circuit therefor, film supply and take-up spools, means for operating the take-up spool, and a reciprocating presser plate for the film, of a multiple cam wheel for operating the presser plate having a series of projections steeply sloped on one side to raise the presser plate and gently sloped on the other side to release the presser plate.

In testimony whereof I affix my signature.

MAURICE M. POMERANZ.